US011162825B2

(12) United States Patent
Isopi et al.

(10) Patent No.: US 11,162,825 B2
(45) Date of Patent: Nov. 2, 2021

(54) SYSTEM AND METHOD FOR CALIBRATING AN OPTICAL FIBER MEASUREMENT SYSTEM (71) Applicant: Humanetics Innovative Solutions, Inc., Farmington Hills, MI (US)

(72) Inventors: Dominic Isopi, Livonia, MI (US); Kees Waagmeester, Lansingerland (NL); Bernard Willem Been, The Hague (NL); Todd Vernaz, Farmington Hills, MI (US); James Davis, Commerce Township, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 43 days.

(21) Appl. No.: 16/802,032

(22) Filed: Feb. 26, 2020

(65) Prior Publication Data
US 2020/0271487 A1    Aug. 27, 2020

Related U.S. Application Data (60) Provisional application No. 62/810,488, filed on Feb. 26, 2019.

(51) Int. Cl.
*G01D 18/00* (2006.01)
*G01D 5/353* (2006.01)

(52) U.S. Cl.
CPC ............ *G01D 18/00* (2013.01); *G01D 5/353* (2013.01)

(58) Field of Classification Search
CPC ..... G01D 18/00; G01D 5/353; G01D 5/35316
See application file for complete search history.

(56) References Cited

U.S. PATENT DOCUMENTS 5,134,281 A    7/1992 Bryenton et al.
5,502,301 A    3/1996 Lord
(Continued)

FOREIGN PATENT DOCUMENTS

CN    202582783 U    12/2012
CN    104833525 A    8/2015
CN    106610273 B    3/2019

OTHER PUBLICATIONS

Humanetics Innovative Solutions, Inc., "3D Metrology & Applications in Crash and Test Labs", Presentation by Mathias Wolff, Humanetics Europe GmbH, May 22, 2017, 30 pages.
(Continued)

*Primary Examiner* — Tony Ko
(74) *Attorney, Agent, or Firm* — Howard & Howard Attorneys PLLC (57) ABSTRACT A system for calibrating an optical fiber measurement system is disclosed that can be used with deformable body parts of an anthropomorphic test device. The system includes a deformable body part and an optical fiber that has a plurality of grating sensors between first and second ends is supported about the deformable body part to generate optical strain data. The deformable body part is loaded into a testing fixture and a load is applied. At least one camera is positioned toward the testing fixture to record the deformable body part as the load is applied thereto and to capture images generating image deformation data for comparison with the optical strain data to determine a correlation, or correction, factor for the optical fiber and the body part.

28 Claims, 10 Drawing Sheets (56) References Cited

U.S. PATENT DOCUMENTS

| | | | |
|---|---|---|---|
| 6,016,709 | A | 1/2000 | Carnicelli et al. |
| 6,668,105 | B2 | 12/2003 | Chen et al. |
| 7,043,997 | B2 | 5/2006 | Mattson et al. |
| 8,805,128 | B2 | 8/2014 | Wild et al. |
| 10,612,911 | B1 | 4/2020 | Pena, III et al. |
| 2004/0200975 | A1 | 10/2004 | Brown et al. |
| 2011/0249252 | A1 | 10/2011 | Lantz et al. |
| 2013/0345718 | A1* | 12/2013 | Crawford ............ A61B 17/025 606/130 |
| 2014/0010525 | A1 | 1/2014 | Chapman |
| 2019/0339207 | A1* | 11/2019 | Finn ....................... B25J 19/025 |
| 2019/0375520 | A1* | 12/2019 | Parker ................. G01M 5/0091 |
| 2020/0049579 | A1* | 2/2020 | Noh ........................ G01L 1/048 |

OTHER PUBLICATIONS

Butz, Robert C. et al., "In-Fiber Bragg Grating Impact Force Transducer for Studying Head-Helmet Mechanical Interaction in Head Impact", Journal of Lightwave Technology, vol. 33, No. 13, Jul. 1, 2015, 8 pages.

Moore, Jason P. et al., "Shape Sensing Using Multi-Core Fiber Optic Cable and Parametric Curve Solutions", Optics Express, vol. 20, No. 3, Jan. 30, 2017, pp. 2697-2973.

Udd, Eric, "25 Years of Structural Monitoring Using Fiber Optic Sensors", 2010, 9 pages.

Westbrook, P.S. et al., "Distributed Sensing Over Meter Lengths Using Twisted Multicore Optical Fiber With Continuous Bragg Gratings", 2017, 9 pages.

Yu, Henry et al., "A Test Bed to Examine Helmet Fit and Retention and Biomechanical Measures of Head and Neck Injury in Simulated Impact", Journal of Visualized Experiments, Sep. 21, 2017, 18 pages.

English language abstract for CN 202582783 U extracted from espacenet.com database on Apr. 22, 2020, 1 page.

English language abstract for CN 104833525 A extracted from espacenet.com database on Apr. 22, 2020, 1 page.

English language abstract for CN 106610273 B extracted from espacenet.com database on Apr. 22, 2020, 1 page.

* cited by examiner

SYSTEM AND METHOD FOR CALIBRATING AN OPTICAL FIBER MEASUREMENT SYSTEM

RELATED APPLICATIONS

This application claims priority to U.S. Provisional Patent Application No. 62/810,488, filed on Feb. 26, 2019, which is hereby incorporated by reference.

BACKGROUND

1. Field of the Invention

The present invention relates generally to a system and method for calibrating an optical fiber measurement system and, more particularly, to a calibration for a specific deformable part with a specific optical fiber.

2. Description of the Related Art

Optical fibers are used to sense temperature and strain of an object that is undergoing a test or experiencing a load. The optical fibers can sense strain and other parameters by utilizing Fiber Bragg Gratings (FBG), Brillouin scattering, Rayleigh scattering, and interferometers. The fibers can be bonded to the object and take direct strain measurements. The applied strain will alter the light traveling down the optical fiber. The changes to the light indicate the amount of strain. The strain measurements can be compiled to create a shape and displacement calculation.

One recent application for such optical fibers is collision testing that is being conducted by automotive, aviation, and other vehicle manufacturers to measure the effects of a collision on a vehicle and its occupants by using anthropomorphic test devices (ATD), commonly referred to as "crash test dummies." The ATD is formed from a plurality of body parts that are connected to one another to simulate a human body. Each of the body parts comprise many discrete components that are intended to represent the articulation of the human body. The collision exposes the ATD to high inertial loading. Previously, accelerometers, strain gauges, and other mechanical and electrical sensors were placed inside the ATD to generate electrical signals of data corresponding to the loading, whereas optical fibers are being used to replace or supplement the sensors. The data from the sensors and optical fibers is transmitted to a data acquisition system (DAS) for subsequent processing. The optical fibers can inadvertently shift or move relative to the body part over time and with continued use or the optical fiber may break and need replacement. Further, the type of bonding material to adhere the optical fiber to the body part may fail, requiring replacement. These situations may produce different or skewed test results.

The movement and distortions of the ATD during a crash test have also been monitored visually using high speed cameras in the past. However, some tests cannot be monitored in this way because of the construction of the structure surrounding the ATD, the presence of other dummies, or the inflation of air bags. Also, the position or shape of individual body parts of the ATD may be difficult to estimate, such as limbs and internal organs. Simulated soft organs are particularly difficult to monitor using traditional strain gauges where it is difficult to measure strain of low Young modulus materials using high Young modulus sensing elements.

To develop skeletal structures, organs, or flesh of the ATD, it is necessary to create or form shapes and materials to adjust for various possible stiffness, which the human body can have in different regions or components. To adjust these components, it is only possible to do this by changing geometry of the body parts or the ATD or using different materials and adjusting as close as possible to the material stiffness requirement. These systems are time consuming to set-up and only represent certain aspects of the human body when subjected to forces.

SUMMARY

The subject invention provides a method of calibrating an optical fiber measurement system having an optical fiber supported about a deformable part. The method includes the steps of disposing the optical fiber about the deformable part with the optical fiber extending between a first end and a second end. The optical fiber has at least one core with a plurality of grating sensors inscribed integrally therein with the sensors spaced along a length between the first and the second ends. The deformable part is positioned in a testing fixture in a neutral state a light from an emitter in a predetermined band of wavelengths is transmitted through at least one of the cores while the deformable part is in the neutral state. A reflected light is detected from the grating sensors with an interrogator when the deformable part is in the neutral state and optical data is generated from the reflected light in the neutral state. Next, a load is applied to the deformable part to define at least one deformed state and the light is transmitted through at least one of the cores while the deformable part is in the deformed state. A reflected light is detected from the grating sensors with the interrogator in at least one deformed state and optical data is generated from the reflected light that is detected in at least one deformed state. Additionally, the method records images with at least one camera of the deformable part from the neutral to the at least one deformed state and image deformation data is generated from images. The image deformation data is compared to the optical data and a correlation factor is generated based on the image deformation data and the optical data so that the optical fiber measurement system is calibrated to ensure accurate measurement of subsequent deformations of the deformable part.

The subject invention also provides a system for calibrating measurement of deformation. The system comprises an optical fiber measurement system that includes a deformable part and an optical fiber supported by the deformable part. The optical fiber extends between a first end and a second end and comprises at least one core having a plurality of grating sensors inscribed integrally therein with the sensors spaced along a length between the first and the second ends for sensing strain thereon. The system also includes an emitter in communication with the optical fiber for emitting a light in a predetermined band of wavelengths through the at least one core that is reflected by the grating sensors and an interrogator in communication with the optical fiber for detecting the reflected light from the grating sensor for generating optical data. A testing fixture supports the deformable part and a load frame machine applies a load to the deformable part and deforms the deformable part thereby inducing strain in the optical fiber such that the grating sensors reflect the light as the deformable part deforms to generate load data. At least one camera records the deformable part as the load is applied thereto and captures images of the deformable part in the various states. A processing system receives the optical data, the load data, and image deformation data and then generates a correlation factor based on the image deformation data and the optical data so that the optical fiber measurement system is calibrated to ensure accurate measurement of subsequent deformation of the deformable part.

Though optical fibers are well-suited to measure strain, the calculations to create displacement and shape values may or may not be accurate. Additionally, the optical fiber could shift or slip that could lead to inaccurate results. In order to validate the calculations and optical strain based deformation output, a correlation factor must be used for the calibration. One of the most accurate ways of measuring large shape and deformation changes is through photography and videography. Photography and videography both utilize image analysis to extract data from the pictures. The image deformation data can be used in two ways. One way is that it can provide an initial reference point for all the future deformation and shape calculations. Many formulas and shape calculations need a starting point to be accurate; the image deformation data provides that initial information. The second way is that the image deformation data can provide an error comparison. The difference between the image deformation data and the optical data from the fiber optic shape calculations will indicate whether the calculations are correct and accurate. A large difference indicates some error is introduced into the test and it should be investigated. Once the correlation factor is determined, the optical fiber is registered to the part as it remains appropriately fixed thereto. The correlation factor can be used to determine the shape for the part for that optical fiber.

Other features and advantages of the present invention will be readily appreciated, as the same becomes better understood, after reading the subsequent description taken in conjunction with the accompanying drawings.

DETAILED DESCRIPTION

Figure 1:
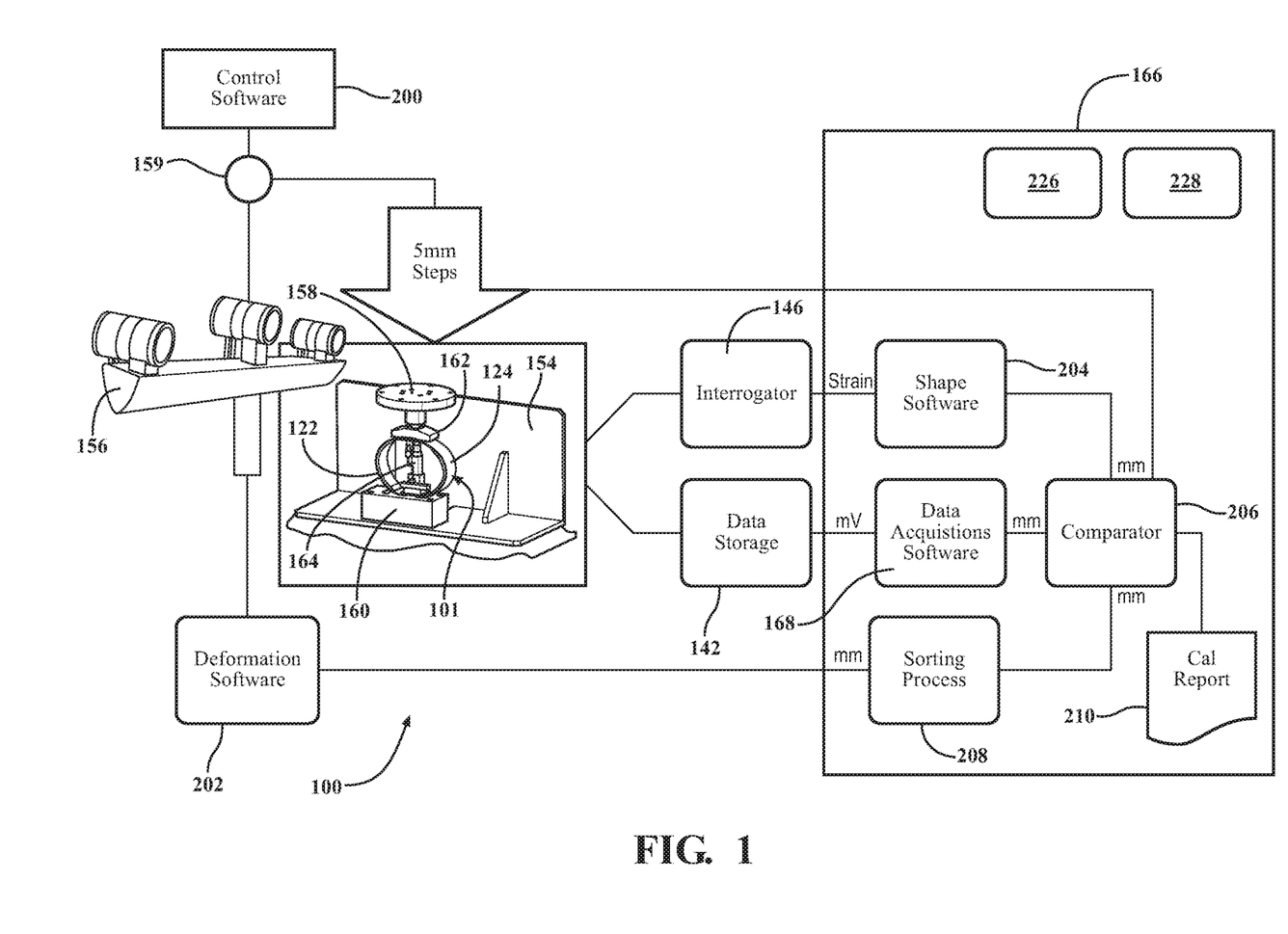
FIG. 1 is a schematic view of a system for calibrating an optical fiber measurement system for a part of an anthropomorphic test device (ATD)

Referring to the drawings and in particular FIG. 1, the subject invention provides a system 100 for calibrating an optical fiber measurement system that can be used with deformable parts 101. In one embodiment, the deformable part 101 includes body parts of an anthropomorphic test device 102. As understood by those of ordinary skill in the art, the deformable parts 101 can be tested individually or in the form of the anthropomorphic test device 102 (shown in FIG. 3) to simulate at least a part of a human body. The system 100 generally includes a testing fixture 154, a camera system 156, and the optical fiber measurement system. The optical fiber measurement system includes the deformable part 101 and an optical fiber 122 that is supported by the deformable part 101. The testing fixture 154, the camera system 156 and the optical fiber 122 are each used to generate data, as will be described in more detail below, that corresponds to the deformation of the part 101.

Specifically, each part 101 has the optical fiber 122 mounted thereon, and depending on various factors, the optical fiber 122 can produce different data or measurements in response to being deformed. The differences in the data can result from numerous factors, including, but without being limited thereto, how the part 101 is manufactured, how the optical fiber 122 is positioned about the part 101, or how the optical fiber 122 is secured or mounted to the part 101. The subject invention determines a correction, or a correlation, factor for each specific part 101 and optical fiber 122 for proper calibration or registration between the two components. Once the correlation factor for the specific part 101 and optical fiber 122 has been determined, it may not be necessary to re-calibrate. The correlation factor is useful to calibrate the optical fiber measurement system to ensure accurate measurement of subsequent deformations of the deformable part 101. However, if the optical fiber 122 moves or is adjusted, or if the part 101 experiences fatigue, it may be necessary to recalibrate and generate a new correlation factor.

The testing fixture 154 supports the deformable part 101 and includes a load frame adapter 158 to be positioned in a load frame machine 159, an adapter block 160, and a loading block 162. The load frame adapter 158 is positioned above the deformable part 101 for applying a load thereto. The adapter block 160 is mounted to a base of the testing fixture 154, which allows the deformable part 101 to be mounted in straight impact and oblique impact configurations. The loading block 162 is disposed between the load frame adapter 158 and the deformable part 101 and can also be used in various mounting patterns. The subject invention can be used with static tests in a load frame machine or dynamic tests on a drop rig.

The load frame machine (shown generically at 159) generally includes control software 200 as is well known to those of ordinary skill in the art that is provided with industry acceptable load frame machines. The load frame adapter 158 is mounted relative to the load frame machine 159. The control software 200 receives inputs, such as amount of load, rate, duration, and distance. As one example, the duration of the test may be for 135 seconds, the maximum compression is 55 mm, at 5 mm steps, and at a speed of 1.67 mm/second and with a measurement interval of 3 seconds. Other inputs may be chosen for different parts 101. The load frame machine 159 is periodically calibrated to ensure accurate inputs. Suitable load frame machines 159 are available under the tradenames, INSTRON, UNITED and ATLAS, or other suitable brands and each may have its own control software 200 that is useable with the subject invention. The control software 200 outputs load data, which may be based on the inputs, and/or it may include the amount of deformation of the part in millimeters.

Figure 2A:
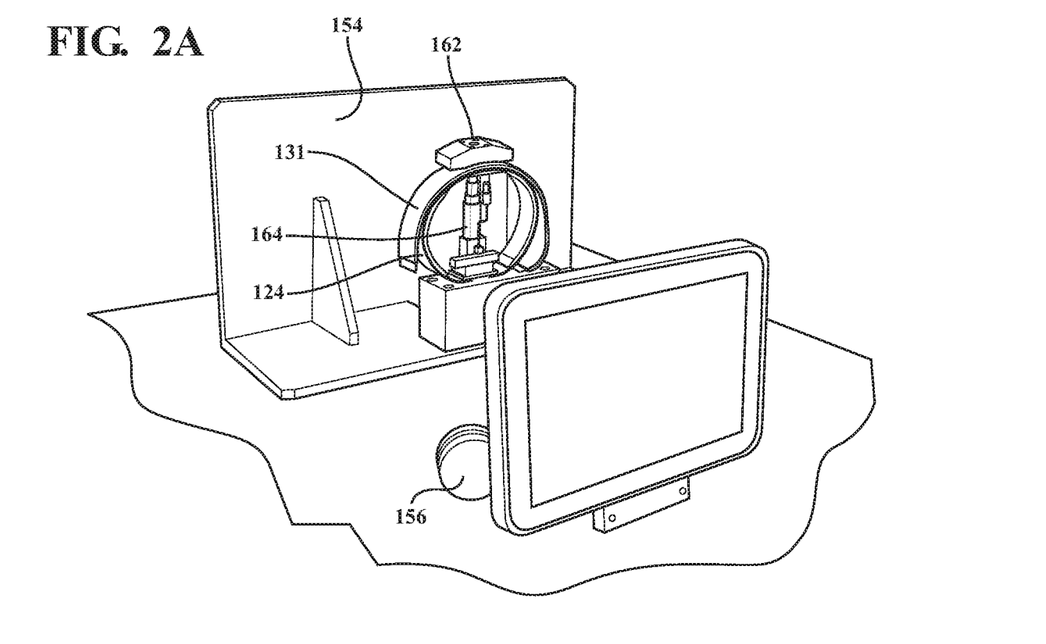
FIG. 2A is a perspective view of one embodiment of the system according to the subject invention.
Figure 2B:
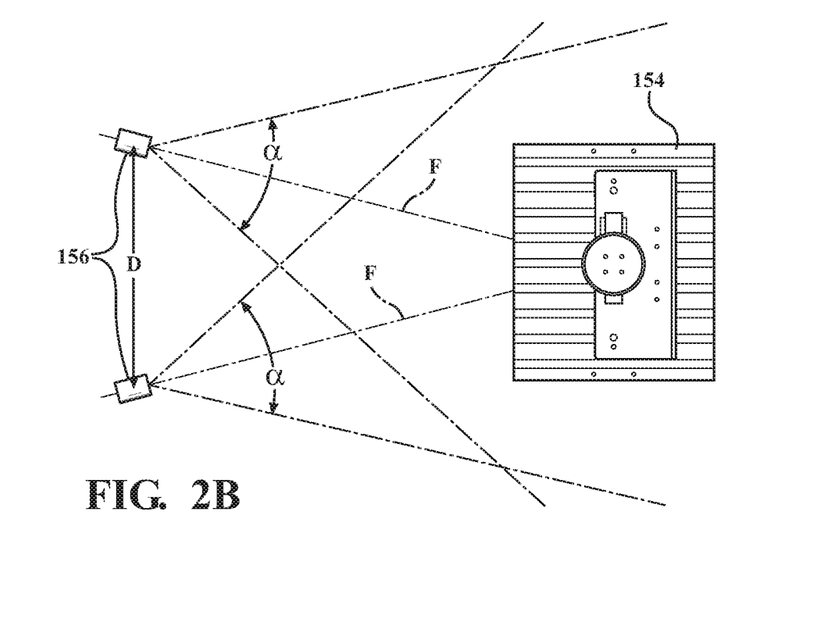
FIG. 2B is a top view of another embodiment of the system according to the subject invention.

The camera system 156 is positioned toward the testing fixture 154 to record the deformable part 101 as the load is applied thereto and to capture images that are used to generate image deformation data. The camera system 156 may include deformation software 202 that receives the images and tracks deformation, as will be described further below. The image deformation data is typically output as millimeters. The control software 200 may also indicate time intervals to acquire images by the camera system 156. For example, the camera system 156 may take images every 3 seconds to detect any deformation. The camera system 156 may include a single camera or a plurality of cameras. The camera system 156 shown in FIG. 1 has three cameras directed toward the testing fixture 154. Alternatively, FIG. 2A is another embodiment having cameras 156 integrated into a mobile computing device, such as an iPad, and FIG. 2B is yet another embodiment having two cameras 156. One example of a suitable camera system 156 is EZ-3D system available from EZ Metrology (FIG. 2A). The camera system 156 can have a focus distance F of from 900-1500 mm, preferably about 1200 mm, and have a view angle α of 45-65 degrees, preferably about 55-57 degrees. The camera system 156 is spaced from the testing fixture 154 at least about 50 mm, and about 1200 mm from the front of the deformable part 101. If more than one camera is used, a predetermined distance D between each camera should be used, such as greater than 200 mm. Another example the predetermined distance D is from 200-600 mm. For instance, one such camera is a EZ-3D device having a focus distance about 300 mm and a predetermined distance D about 210 mm. The subject invention allows for a measurement accuracy of at least ±0.10 mm, and preferably less than ±0.07 mm.

The optical fiber 122 has a plurality of grating sensors 144 (shown in FIG. 4) disposed along its length and generates optical data. The optical data is used with the image deformation data to determine the correlation, or correction, factor, which can be used to assess how accurately the optical fiber 122 measures deformation of the part 101 under specific forces, or loads. As understood by those of ordinary skill, the optical data can be used to calculate the strain on the optical fiber 122. When the optical fiber 122 experiences no outside forces, the grating sensors 144 would still reflect light in a default or initial pattern. As the optical fiber 122 undergoes strain, the grating sensors 144 reflect a different pattern of light. The reflected light is detected as the optical data. The optical data may also be referred to as optical strain data. Additionally, when undergoing physical tests, slippage may occur which would generate inaccurate data. The slippage might occur between the optical fiber 122 and the deformable part 101 or between the load frame adapter 158 and the deformable part 101. The subject invention provides the correlation factor to determine if such slippage occurs and allows the system 100 to account for the slippage.

The system 100 also includes an interrogator 146 in communication with the optical fiber 122. The interrogator 146 can receive signals from up to 70 grating sensors 144. The interrogator 146 may have a sample rate limit of approximately twenty (20) kHz for eight (8) channels and one (1) MHz for single channels. The interrogator may have four (4) channels with eight (8) grating sensors 144 per channel. One example of a suitable interrogator 146 for the subject invention is available from Ibsen Photonics as I-MON 512. It should be appreciated that, once the reflected signal is received, the interrogator 146 may store or transmit the data for subsequent data processing. The interrogator 146 outputs strain data which can be used to determine or calculate deformation, or deflection, of the part 101.

The deformable part 101 may also include a telescoping rod 164 operatively connected to the deformable part 101 for generating compression signals. One suitable telescoping rod 164 is commonly referred to as an Infra-Red Telescoping Rod for the Assessment of Chest Compression (IR-TRACC) that can be used with a rib 124 to detect chest compressions. The IR-TRACC 164 generates chest compression data and outputs it as a milli-volt, which can be converted to millimeters to correspond to deformation or deflection of the part 101. Typically, the IR-TRACC generates a single point of compression data. The chest compression data may be output and stored in a data storage 142 or it could be processed in real time without the need for it to be stored.

As shown in FIG. 1, the system 100 includes a processing system 166 in communication with the load frame machine 159 and the control software 200, the camera system 156 and the deformation software 202, and the optical fiber 122 through the interrogator 146. The communication may be direct or indirect through other components or software without deviating from the subject invention. The processing system 166 processes and compares, via a comparator 206, the optical data, the image deformation data, and the load data. It is to be appreciated that the comparator 206 may not use each of the data inputs or may use different data to arrive at the correlation factor for each part 101. As will be described below, the image deformation data is available as a distance, such as millimeter, and the optical data is converted to a distance, such as in millimeters. The processing system 166 is able to compare the image deformation data with the optical data to determine the correlation factor.

The processing system 166 may also include a data acquisition software 168 that is operatively connected to the IR-TRACC 164 for generating compression data corresponding with the compression signals. The IR-TRACC 164 outputs the compression data as millivolts, what the data acquisition software 168 converts to millimeters.

The processing system 166 may further includes storage media 228 to store the data, such as RAM, ROM, flash memory, EEPROM, hard disk drive, solid state drive, or any other suitable device. The storage media 228 may be the same or different than the data storage 142. The processing system 166 may include a network adapter 226 for communicating wired or wirelessly with other devices. The processing system 166 may also include standard hardware, such as processor, power supply, and the like, necessary for the processing system 166 to operate and perform the subject invention as described herein and communicate with the different software.

Figure 3:
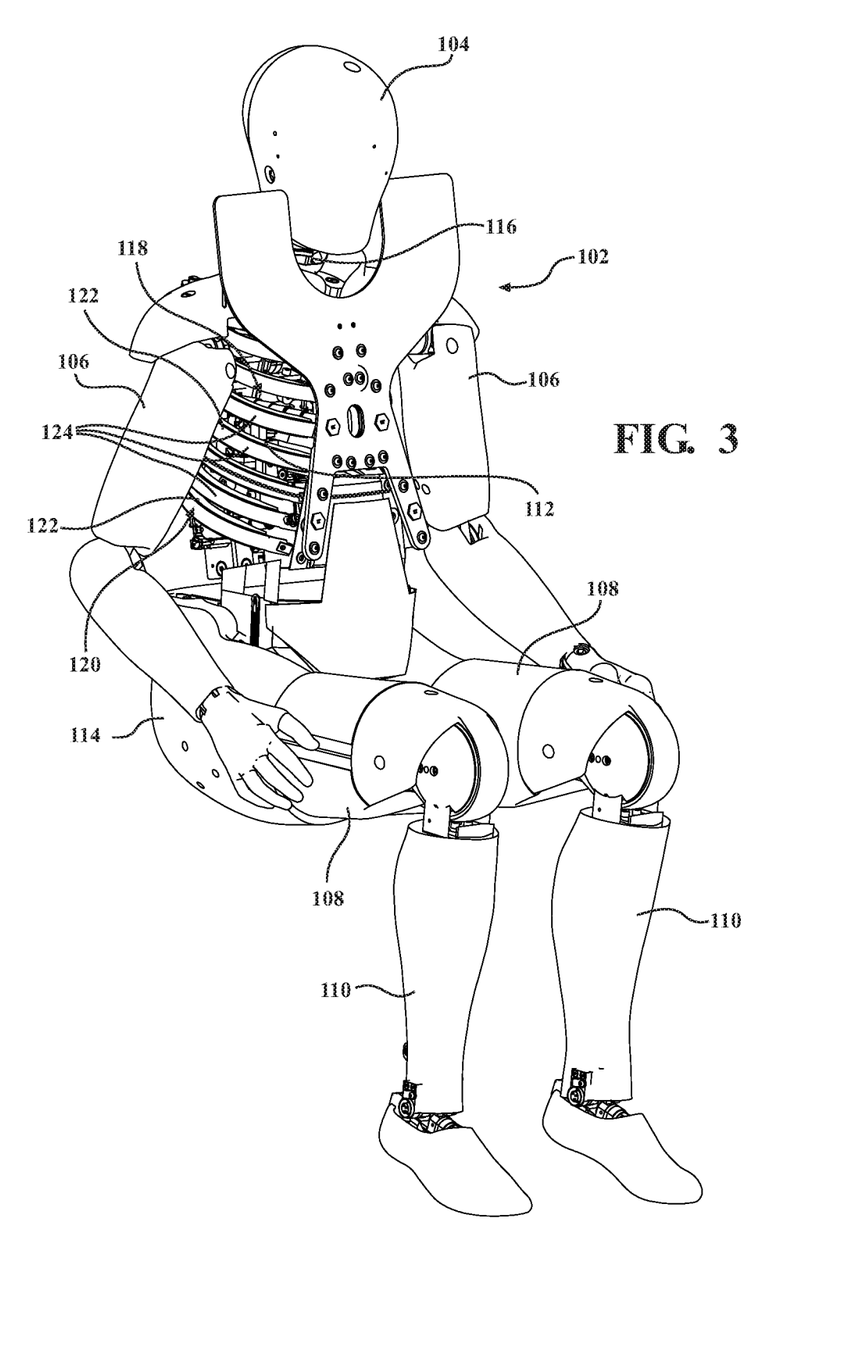
FIG. 3 is a perspective view of an ATD having a plurality of parts.

Referring to FIG. 3, the deformable parts 101 may be body parts used to form an anthropomorphic test device 102, which is shown as a fiftieth percentile (50%) male type and is illustrated in a sitting position. The ATD 102 is used primarily, but without limitation, to test the performance of automotive interiors and restraint systems for adult front and rear seat occupants. The size and weight of the ATD 102 is based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. The ATD 102 can also be used to test the force of impacts on a simulated human body directly in various testing stands, such as neck twist fixtures, chest impact fixtures, and the like.

The ATD 102 includes various deformable parts 101, such as a head assembly 104, a right and left arm assembly 106, a right and left upper leg assembly 108, a right and left lower leg assembly 110, a thorax assembly 112, and a pelvis assembly 114. The deformable parts 101 may also include a neck assembly 116 that connects the head assembly 104 to the thorax assembly 112. The thorax assembly 112 also includes a spine assembly 118 having an upper end mounted to the head assembly 104 and a lower end extending into a torso area of the ATD 102. The thorax assembly 112 also includes a rib cage assembly 120 formed of a plurality of ribs 124 connected to the spine assembly 118. An instrumentation core may be mounted within the various parts 101 and may be removable for access to the part 101. It should be appreciated that the right and left assemblies are generally constructed in a similar manner. It is to be appreciated by one of ordinary skill in the art that the individual components forming the ATD 102 are well known and can be varied based on the particular ATD 102 without deviating from the subject invention.

The deformable parts 101 may also include a rigid component and a flexible component. Rigid component of the ATD 102 are meant to mimic and/or simulate rigid parts of a human body, such as bone. Flexible components are meant to mimic and/or simulate flexible parts of the human body, such as flesh, muscle, tissue, organs, and the like. The ATD 102 combines rigid and flexible components to more accurately represent the human body. For example, an arm assembly includes the rigid component corresponding to the bones and the flexible component corresponding to the flesh, muscle, and tissue. Referring to the flexible component, it should be appreciated that various materials, such as a urethane or plastic, can be used to form the flexible parts 101 for improved coupling with the rigid component of the anthropomorphic test device.

Figure 4:
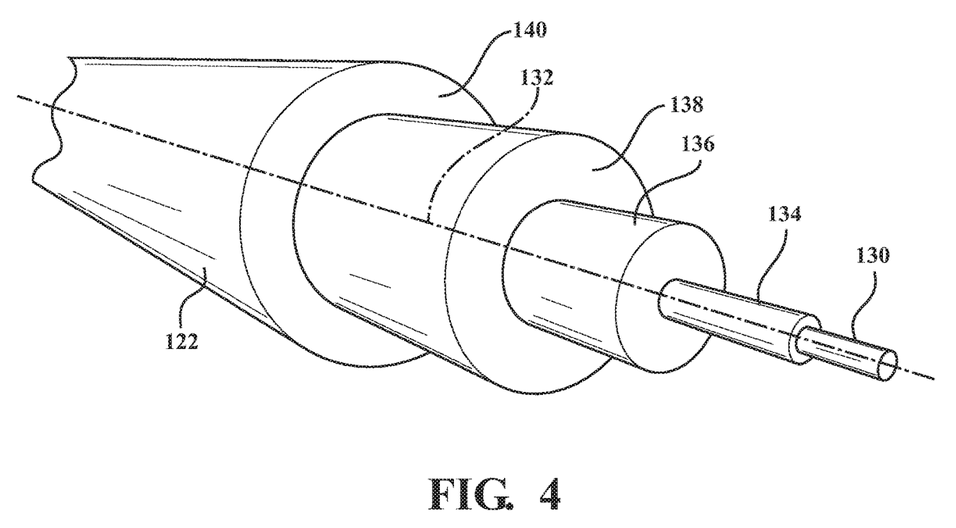
FIG. 4 is a partial cut away, perspective view of an optical fiber for use in the optical fiber system of the subject invention.

Referring to FIG. 4, one suitable optical fiber 122 for use in the subject invention is shown having a core 130 that extends between the first and the second end 126, 128. The optical fiber 122 further defines a longitudinally extending, fiber axis 132. In this embodiment, the core 130 surrounded by a cladding material 134. A coating material 136 surrounds the cladding material 134 to provide strength to the core 130 and cladding material 134. Optimally, although not necessarily, a strength member 138 and an outer jacket 140 may also surround the coating material 136 to provide additional strength to the optical fiber 122.

The optical fiber 122 may have a diameter from 30 to 1000 microns. In one embodiment, the optical fiber 122 has a diameter of from 100 to 300 microns. The optical fiber 122 may be a single core or multiple cores. If multiple cores 130 are used, each of the cores may have a same diameter or different diameters. Each of the cores 130 may have a same diameter or different diameters. In one embodiment of the system 100, each of said cores 130 has a diameter of from 2 to 900 microns. In another embodiment, the core 130 would typically have a diameter of less than 30 microns, and particularly from 5-20 microns. One preferred optical fiber 122 has a core 130 with a diameter of about 8 microns. The cladding material 134 is typically about 75-200 microns and particularly from 100-150 microns. In another embodiment, the optical fiber 122 has a diameter of from 100 to 200 microns. The optical fiber 122 can be sized for the particular part 101. One common diameter for the optical fiber 122 is about 75-150 microns.

Figure 5:
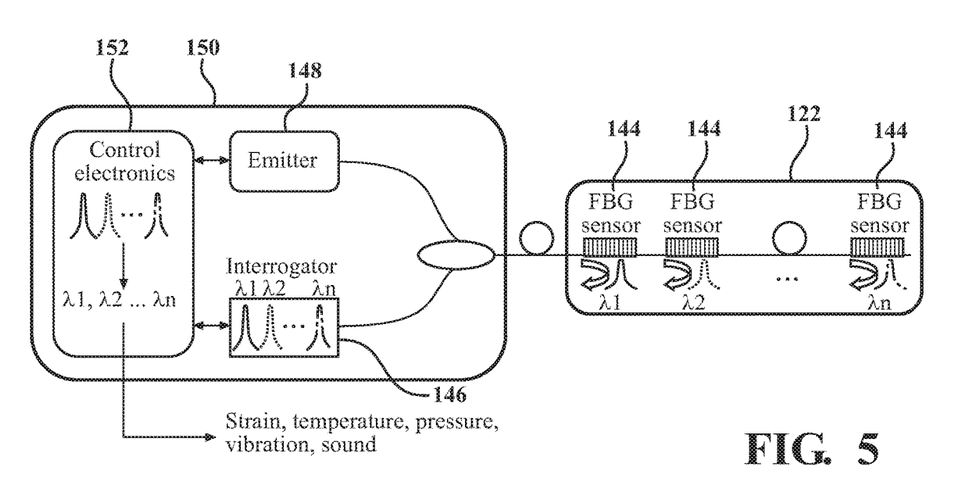
FIG. 5 is a schematic view of the optical fiber in communication with a control box according to one embodiment of the subject invention.

Referring to FIG. 5, the system 100 includes an emitter 148 and the interrogator 146 in communication with the optical fiber 122 and a controller 152 housed within a control box 150. The emitter 148 emits a light having a predetermined band of wavelengths through the optical fiber 122 that is reflected by the grating sensors 144. The emitter 148 sends out light in different wavelengths in this band so that it covers a wide spectrum. As one example, the emitter 148 emits the light having a predetermined band wavelength that is from 50 to 450 nanometers. In one embodiment, the wavelength band can be in the range of 1510-1595 nanometers. In another embodiment, the wavelength band can be in the range of 1275-1345 nanometers. In still another embodiment, the wavelength band can be in the range of 780-850 nanometers. It is also possible that the wavelength band is suitable for red diode lasers. It is to be appreciated that these wavelength bands are exemplary and are not intended to limit the subject invention.

The emitter 148 can emit the light in discrete signals or as continuous signals. As one example, the light can be transmitted once when the part 101 is in the neutral state 300, once when the part 101 is in an intermediate state 302, and again when the part 101 is in the deformed state 304. As another example, the light can be transmitted continuously while the load is applied to the part 101 and as the deforms from the neutral state 300 to the deformed state 304.

The core 130 has a plurality of grating sensors 144 disposed along a length thereof. The sensors 144 are inscribed integrally in the core 130 with the sensors 144 spaced along a length between the first and the second ends for sensing strain thereon. It is to be appreciated that the sensors 144 are shown schematically as part of the optical fiber 122, while the actual sensors 144 are not visible from outside of the optical fiber 122. The optical fiber 122 may include indications or markings where the sensors 144 are located within the optical fiber.

The light propagates through the optical fiber 122, is reflected by the grating sensors 144 and returns to the interrogator 146. The grating sensors 144 have different periods so it is possible to distinguish between the signals of different grating sensors 144. The reflected light is used to generate optical data, which is well known in the optical fiber arts. The actual strain and, in turn, the stress on the part 101 can be deduced from the light signals which return from the grating sensors 144. Shape software 204 receives the output from the interrogator 146 as strain data and calculates the shape and the amount of change of the part 101. The optical data can be used to determine a sensor location of each of the grating sensors as the deformable part 101 deforms from the neutral state 300 to the deformed state 304. One example of shape software that may be used with the subject invention is described in U.S. Pat. No. 10,612,911 having Ser. No. 16/120,555 entitled "Fiber Optic System for Monitoring Displacement of a Structure Using Quaternion Kinematic Sensing," filed on Sep. 7, 2018, which is incorporated herein by reference. For example, if the part 101 is a rib, the optical data is received by the shape software 204 and, based on the position of the grating sensors 144 and the optical data, the shape of the rib is determined. The optical data is collected at multiple different intervals that correspond to the images from the deformation software 202. The detection of strain could be provided by Fiber Bragg Gratings (FBGs), Brillouin scattering, Rayleigh scattering, interferometers, or any other optical technique as is known to those of skill in the art. Although the grating sensors 144 are described as integral with the optical fiber 122, it is to be understood by one of ordinary skill in the art that optical time domain reflectometry (OTDR) could be used with Brillouin or Rayleigh scattering to achieve the subject invention by using a time of pulse to determine the location of the strain without having integral sensors.

The number of grating sensors 144 can be selected based on the particular part 101 undergoing tests. For example, the optical fiber 122 can have from 7 to 25 grating sensors 144 disposed between the ends. Other embodiments may have up to 70 grating sensors 144 per core 130. For certain parts 101, the grating sensors 144 may be disposed equidistance from one another along the optical fiber 122 and about the part 101. For other parts 101, the grating sensors 144 may be more closely located to one another. The optical fiber 122 may be positioned with the grating sensors 144 in specified locations or extending continuously about the part 101.

Figure 6:
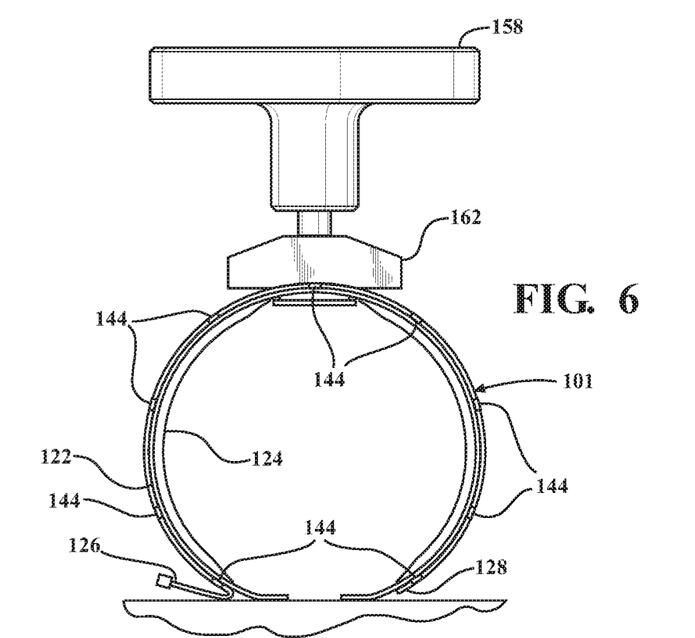
FIG. 6 is a side view of one embodiment of a testing fixture and a part to be tested.

Referring to FIG. 6, a side view of one embodiment of the testing fixture 154 is shown having one of the ribs 124 mounted therein with the optical fiber 122 extending between first and second ends 126, 128. The optical fiber 122 may mount directly to a surface of the part 101 or is embedded within the part 101. It is to be appreciated that mounting can be achieved with adhesive, glue, tape, or the like. It is to be further appreciated that embedding the optical fiber 122 can be achieved by various methods as such as by molding or casting the part 101 around the optical fiber 122. It is also possible that the part 101 could be 3D printed about the optical fiber 122 or vice versa. The load frame adapter 158 is positioned above the rib 124 to apply a straight downward force to the rib 124.

Figure 7:
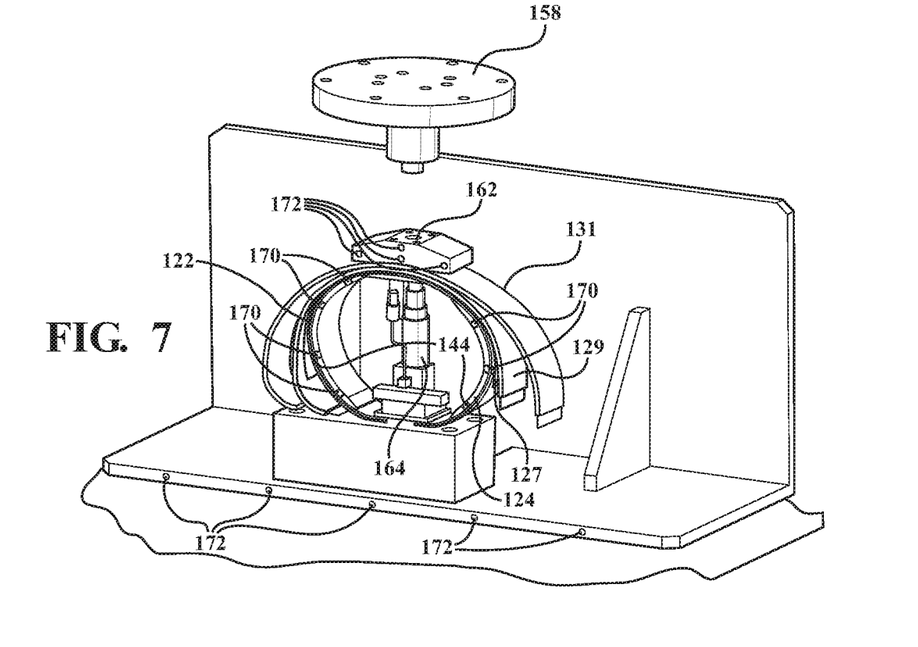
FIG. 7 is a front, perspective view of another embodiment of a testing fixture and a part to be tested.

With reference to FIG. 7, a side, perspective view of another embodiment of the system is shown, with the deformable part 101 to be tested is the rib 124. The rib 124 is generally circular in shape and forms part of the rib cage assembly 120 for the ATD 102. The rib 124 can be formed of multiple layers, such as an inner rib layer 125, an outer rib layer 127. Further, depending on where the particular rib 124 is located, it can be covered by other parts 101. In FIG. 7, the rib 124 includes the inner rib layer 125, the outer rib layer 127, a shoulder rib layer 129, and an abdomen rib layer 131. The additional layers may dissipate the forces from the load frame adapter 158 and/or impact the amount of deformation that the rib 124 undergoes. Further, the ATD 102 may have other vests or jackets that are used during testing so additional layers may be used with the subject invention to determine the level of impact.

The system 100 may include a plurality of target points 170 spaced about the deformable part 101 that are detectable by the camera system 156 and at least one reference point 172 supported on the testing fixture 154 that is detectable by the camera system 156. It is to be appreciated that target points 170 and reference point 172 are optical targets capable of being detected by the camera system 156 and are used by the deformation software 202 to generate image deformation data. The image deformation data can determine a target point location of each of the target points as the deformable part 101 deforms from the neutral state 300 to the deformed state 304. The points 170, 172 provide both the place in space and relative displacement of the deformable part 101. In one embodiment, the plurality of target points 170 are spaced equidistant from one another about the part 101. In another embodiment, the target points 170 are repeated every 10 degrees along the rib 124. The optical fiber 122 may be positioned so that at least one grating sensor 144 is adjacent at least one target point 170. In FIG. 7, there are white target points 170 on the inner rib layer 125, white reference points 172 on the testing fixture 154 and on the loading block 162. As the load is applied in a pure lateral direction, the camera system 156 measures the target points 170 relative to the reference points 172 to generate the image deformation data with the deformation software 202. This embodiment also includes the IR-TRACC 164 and generates compression data.

Figure 10:
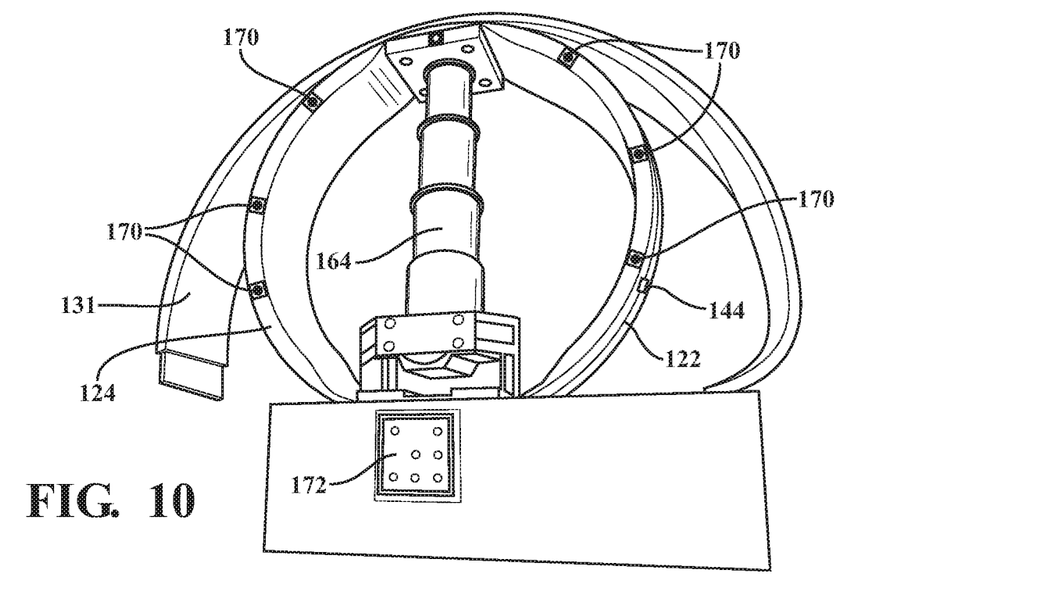
FIG. 10 is front view of still another embodiment of a part in a testing fixture.
Figure 11:
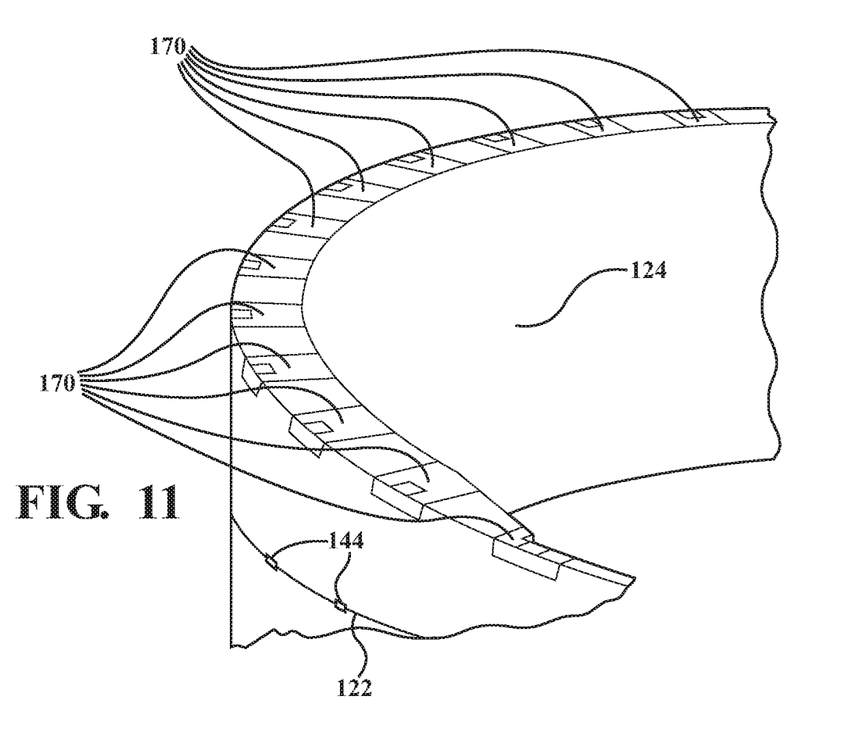
FIG. 11 is a close-up view of a part to be tested having a plurality of target points thereon.

As shown in FIGS. 7, 10, and 11, the target points 170 and reference points 172 may be white retro-reflective circles painted around a black painted square. Alternatively, the points could be white retro-reflective square with a black dot. If necessary for the desired contrast, white retro-reflective lines can be added on the cylindrical part to complete the white field around the targets. The points may also be machined into the deformable part 101 and/or the testing fixture 154. For example, the point may be embossed, 0.1 mm deep, and filled (for example, to be flush) with retro-reflective white paint. A predetermined number of target points 170 should remain in view of the camera system 156 during the test. As one example, a minimum of eight target points 170 should remain continuously in the view of the camera 156.

Figure 8:
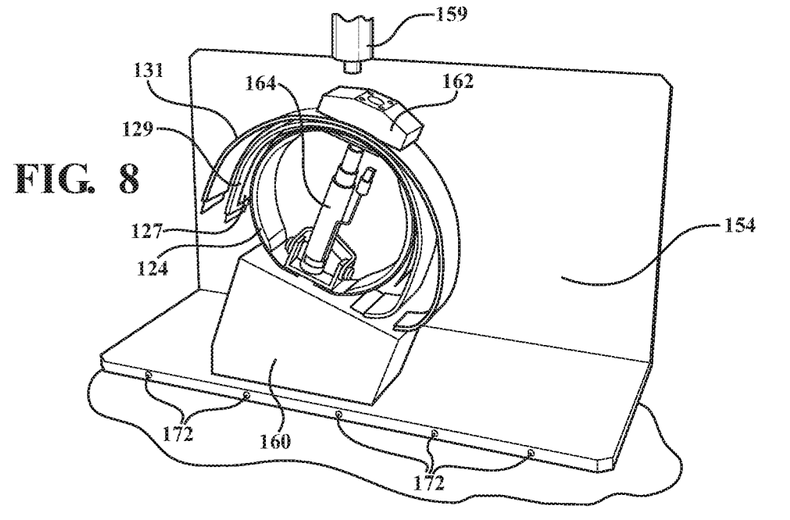
FIG. 8 is front, perspective view of the embodiment shown in FIG. 7 having a load applied from a different angle.
Figure 9:
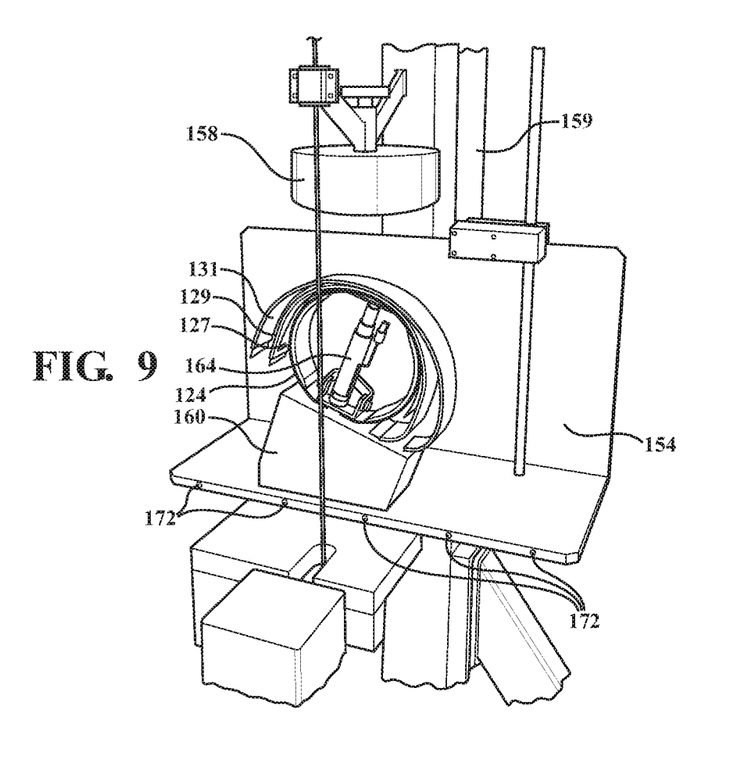
FIG. 9 is a front, perspective view of yet another embodiment of a part in a testing fixture with a drop tower.

Referring to FIG. 8, another embodiment is shown having the load frame adapter 158 applying a left 20 degrees oblique from the front to the rib 124 which has the inner rib layer 125, outer rib layer 127, the shoulder rib layer 129, and the abdomen rib layer 131. The load is being applied by the load frame machine 159, such as an INSTRON. FIG. 9 is yet another embodiment having the rib 124 to be tested, but the load frame adapter 158 is a drop tower. FIG. 10 is still another embodiment having the rib 124 to be tested, which includes the inner rib layer 125 and the outer rib layer 127. The target points 170 are white squares with black dots spaced about the inner rib layer 125. The reference point 172 is embossed into the testing fixture and painted white with black dots. With reference to FIG. 11, a close-up view of the inner rib layer 125 is shown having target points 170 disposed thereabout.

Figure 12:
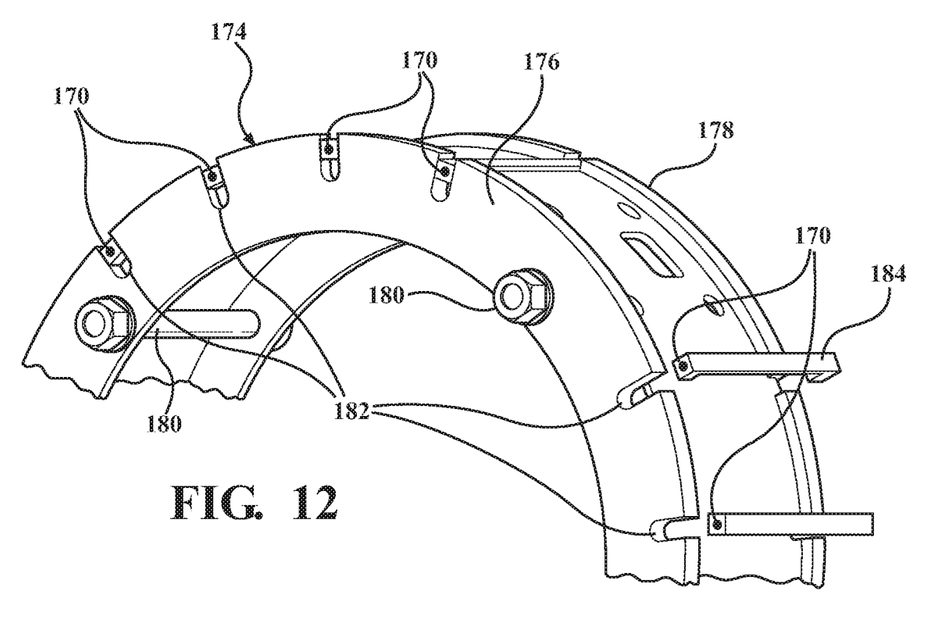
FIG. 12 is perspective view of positioning tool secured about a rib for locating target parts about the rib.
Figure 13:
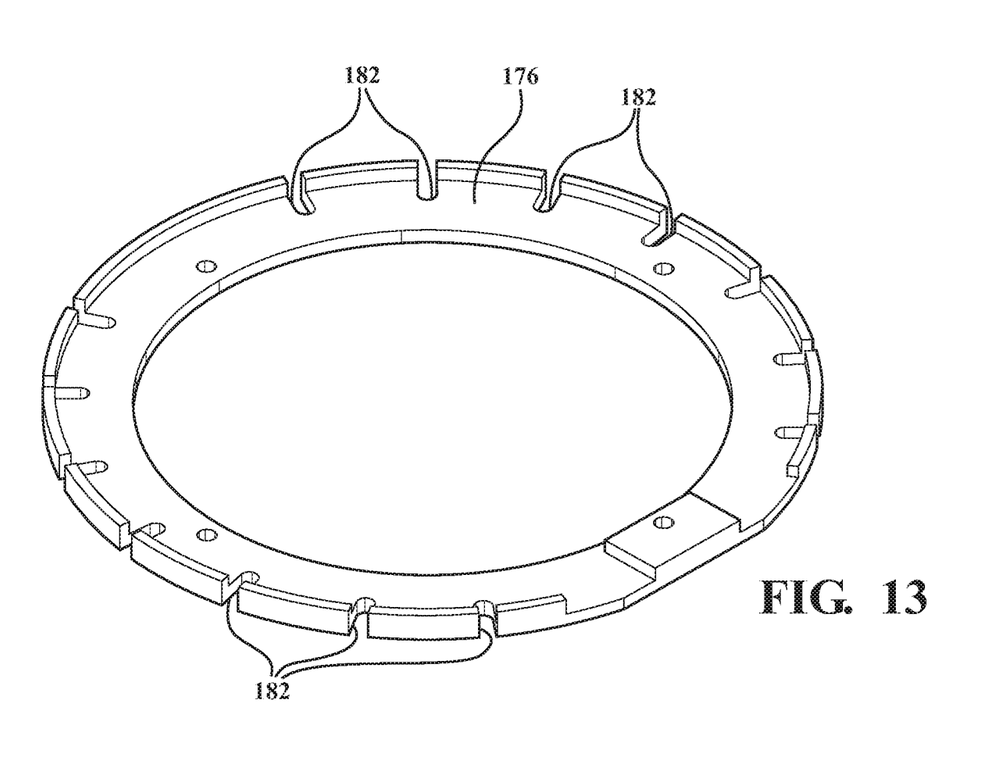
FIG. 13 is a perspective view of a front plate used for forming the positioning tool.
Figure 14A:
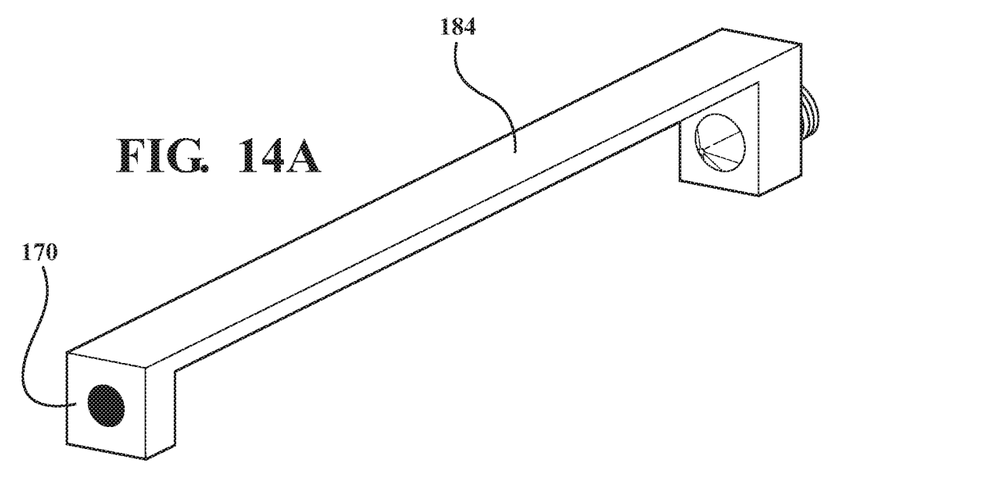
FIG. 14A is a top down, front perspective view of a target carrier for use with the positioning tool.
Figure 14B:
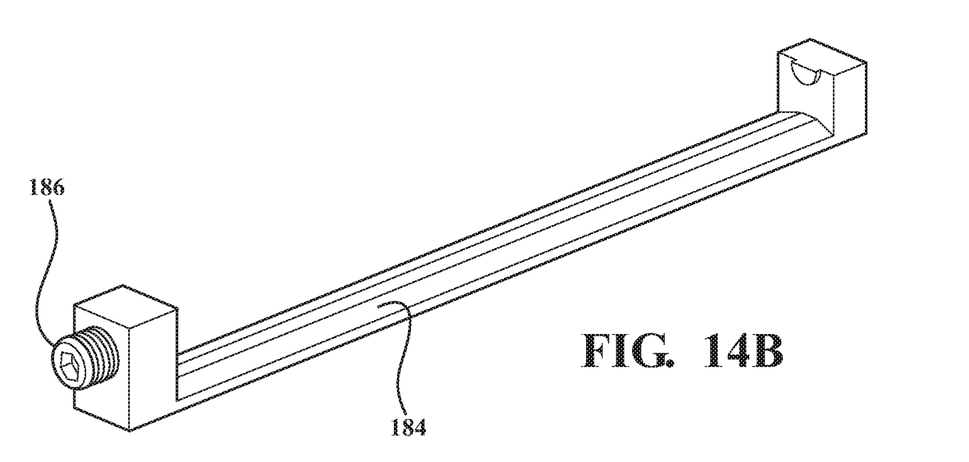
FIG. 14B is a bottom up, rear perspective view of the target carrier shown in FIG. 14A.
Figures 15, 16:
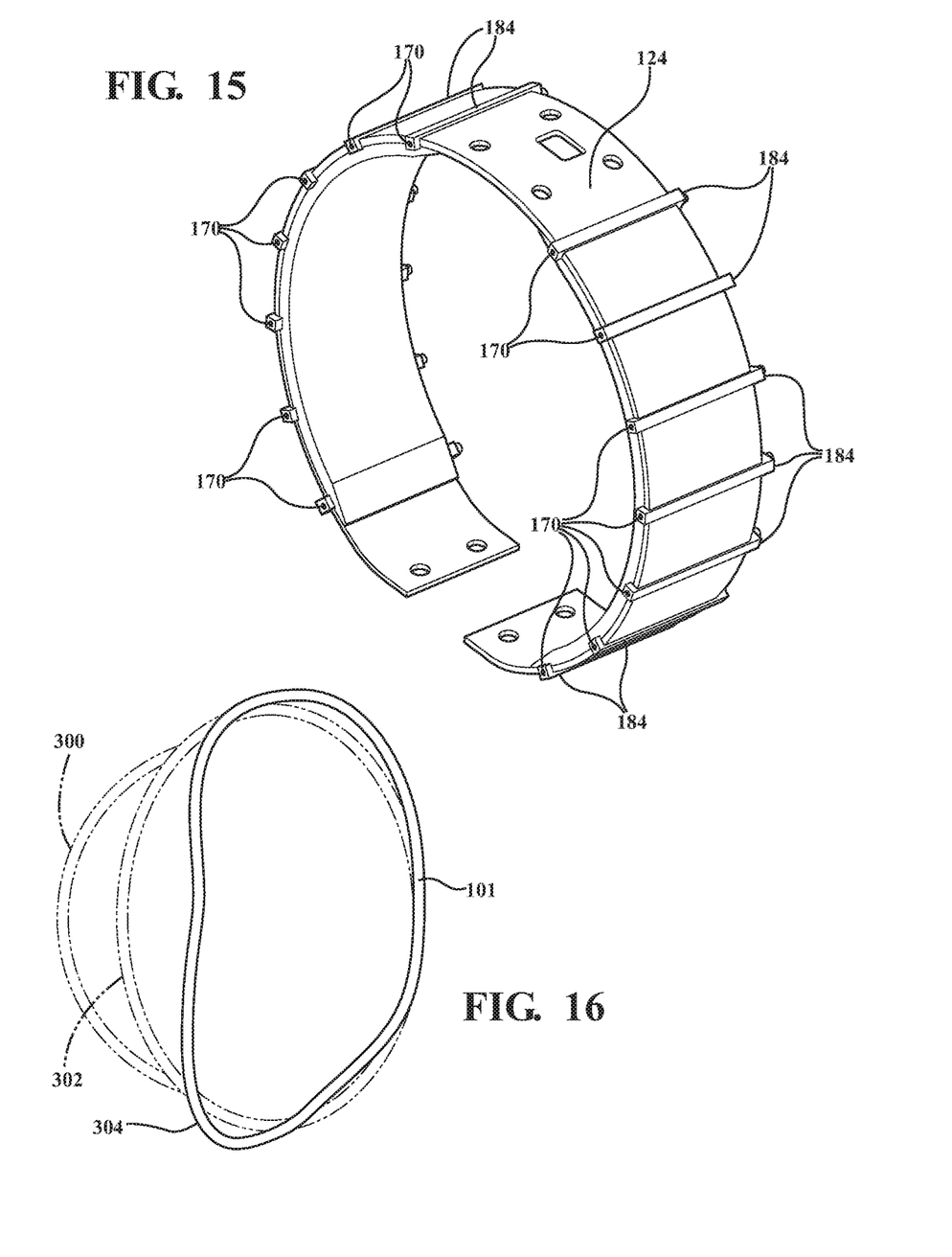
FIG. 15 is front perspective view of the rib having a plurality of target carriers secured thereto.
FIG. 16 is a top down view of the deformable part showing various stages of deformation.

To ensure the target positions are consistently in the same location and to make the test repeatable, the subject invention provides a positioning tool 174 that can be used to locate the target points 170, which is shown in FIG. 12. The positioning tool 174 includes a front plate 176 and a rear plate 178 that are secured about the rib 124. The plates 176, 178 have fasteners 180 that are used to temporarily hold the positioning tool 174 in place. The plates 176, 178 have recesses 182 that align for receiving a target carrier 184. The target carrier 184 is placed in the recess 182 and then secured to the rib 124. Once each of the target carriers 184 are secured, the front and rear plates 176, 178 are removed. FIG. 13 is a perspective view of the front plate 176. It is to be appreciated that the rear plate 178 is similar to the front plate 176. FIG. 14A is a front, top-down perspective view of the target carrier 184 and FIG. 14B is a rear, bottom-up perspective view of the target carrier 184. The target carrier 184 includes a set screw 186 for securing the carrier 184 to the rib 124. FIG. 15 is a front perspective view of the rib 124 having the target carriers 184 secured thereto.

In operation, the subject invention provides a method for calibrating the optical fiber measurement system. The method comprises the steps of disposing the optical fiber 122 about the deformable part 101, positioning the deformable part 101 in the testing fixture 154 in a neutral state 300, and transmitting light from the emitter 148 in a predetermined band of wavelengths through the optical fiber 122 while the deformable part is in the neutral state 300. FIG. 16 is a top down view of the deformable part 101 without the other systems, showing various stages of deformation from the neutral state 300, to an intermediate state 302, and a deformed state 304. The reflected light from the grating sensors 144 is detected with the interrogator 146 and optical data is generated from the reflected light in the neutral state 300. The optical data is input into the shape software 204 to generate the shape of the part 101. Next, a load is applied to the deformable part 101 with the load frame adapter 158 to define at least one deformed state 304. There can be multiple intermediate states 302 between the neutral state 300 and the deformed state 304 depending on the particular part 101 and the desired accuracy of the optical fiber measurement system. The deformation of the deformable part 101 could also be continuous or step-wise. As the load is applied and the deformation occurs, the reflected light from the grating sensors 144 is detected with the interrogator 146 and optical data is generated from the reflected light until the deformed state 304 is reached. This optical data continues to be fed to the shape software 204 to calculate the curve of the part 101 and to determine the amount of change in the part 101. The change may be based on the sensor location of each of the grating sensors as the deformable part deforms.

Simultaneously, the camera system 156 is recording images of the deformable part 101 in the neutral and deformed states 300, 304, which can be used to generate image deformation data at set intervals or continuously. The deformation software 202 is tracking points 170, 172 to generate the shape (or curve) of the part 101 and the amount of change. The target point location of each of the target points 170 as the deformable part deforms from the neutral state 300 to the deformed state 304 is used to determine deformation.

A sorting process 208 may be used, if necessary, to orient the points 170, 172 from the deformation software 202. The image deformation data is then compared by the comparator 206 to the optical data and a correlation factor is generated between the image deformation data and the optical data for the deformation. The image deformation data is likely more accurate than the optical data and the correlation factor represents the alteration of the shape software when computing the curvature or shape of the part 101. As one example, the comparator 206 may compare the sensor location to the target point location to determine the correlation factor for each of the respective sensors 144 and target points 170. The correlation factor may be used to further refine the shape from the optical data and/or be for subsequent deformations in alternate impacts, such as crash tests.

In other words, when forces are applied to the deformable part 101, the optical fiber 122 is subjected to stress or strain which causes the grating sensors 144 to undergo a change, such as by expanding or contracting. Expanding or contracting the grating sensors 144 change the reflected light pattern. As one example, the changes in the reflected light pattern are detected, which can then be compared to known changes to determine the amount of movement or deformation of the part 101. The forces that are applied may deform the part 101 and/or the optical fiber 122. The forces may also include changes within the environment, such as temperature or pressure, which may cause changes to the optical fiber 122 sufficient to alter the reflected light pattern.

Additionally, the target and reference points 172 define a datum line for the transformed coordinate system as the load is applied. The duration of the test may be for 135 seconds and the maximum compression from the load frame adapter 158 is 55 mm. The load frame machine 159 is set at 5 mm steps and has a speed of 1.67 mm/second. The system has a measurement interval of 3 seconds. The camera 156 is able to track the target points 170 relative to the reference points 172 and determine its position in space. Measurements are taken every 3 seconds to detect any deformation and the values displayed at this point reflect the change in position from the initial neutral state 300.

The system generates a calibration report 210, such as a csv or Excel file, that can be evaluated to find actual displacement of the part 101 and generate shapes of the deformable part 101. The shape is based upon the curvature of each target point and the curvature at each of the grating sensor 144 locations along the optical fiber 122 measured by the interrogator 146. Further, the curvature between grating sensor 144 locations can be estimated using cubic splines. The calibration report 210 is then feed back into the shape software 204 to develop the deformation of the part 101 with the optical fiber system 100. As one example with the part 101 being the rib 124, the rib 124 is broken up into roughly 200 individual segments. The bending of each segment is estimated by the curvature spline. These estimates are used to "build" the shape of the rib 124. As another example, the shape of each "half rib 124" is calculated relative to the fixed reference points 172.

Still another example uses point cloud from the camera system 156 and displacement data from the load frame adapter 158, which estimates the shape of rib 124 using X and Y coordinate splines and point cloud data from image deformation data. The curvature is calculated at each grating sensor 144 location and a calibration value for each grating sensor 144 based on curvature and delta wavelength is calculated. The calibration information is saved in a database (not shown).

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method of calibrating an optical fiber measurement system having an optical fiber supported about a deformable part, said method comprising the steps of:

disposing the optical fiber about the deformable part with the optical fiber extending between a first end and a second end and comprising at least one core having a plurality of grating sensors inscribed integrally therein with the sensors spaced along a length between the first and the second ends;

positioning the deformable part in a testing fixture in a neutral state;

transmitting light from an emitter in a predetermined band of wavelengths through at least one of the cores while the deformable part is in the neutral state;

detecting a reflected light from the grating sensors with an interrogator when the deformable part is in the neutral state;

generating optical data from the reflected light in the neutral state;

applying a load to the deformable part to define at least one deformed state;

transmitting the light through at least one of the cores while the deformable part is in the deformed state;

detecting a reflected light from the grating sensors with the interrogator in at least one deformed state;

generating optical data from the reflected light that is detected in at least one deformed state;

recording images with at least one camera of the deformable part from the neutral to the at least one deformed state;

generating image deformation data from images;

comparing the image deformation data to the optical data; and generating a correlation factor based on the image deformation data and the optical data so that the optical fiber measurement system is calibrated to ensure accurate measurement of subsequent deformations of the deformable part.

2. A method as set forth in claim 1 wherein the step of recording images further comprises the step of positioning a plurality of target points spaced about the deformable part and detecting at least some of the plurality of target points with the camera.

3. A method as set forth in claim 2 wherein the step of positioning the plurality of target points is further defined as spacing the target points equidistant from one another about the part.

4. A method as set forth in claim 2 further comprising the step of establishing at least one reference point supported on the testing fixture and detecting the reference point with the camera.

5. A method as set forth in claim 4 further comprising the step of generating compression signals from a telescoping rod operatively connected to the deformable part and recording compression data based on the compression signals, and further generating the correlation factor with the compression data to further improve the optical data.

6. A method as set forth in claim 4 further comprising the step of positioning the target points relative to the deformable part with a positioning tool.

7. A method as set forth in claim 2 further comprising the step of positioning the sensors adjacent the target points.

8. A method as set forth in claim 7 further comprising the step of determining a sensor location of each of the grating sensors as the deformable part deforms from the neutral state to the deformed state.

9. A method as set forth in claim 8 wherein the step of generating image deformation data is further defined as determining a target point location of each of the target points as the deformable part deforms from the neutral state to the deformed state.

10. A method as set forth in claim 9 wherein the step of comparing the image deformation data and the optical data is further defined as comparing the sensor location to the target point location.

11. A method as set forth in claim 10 wherein the correlation factor is based on the sensor location and the target point location and the correlation factor is used to further refine the shape from the optical data.

12. A method as set forth in claim 1 further comprising the step creating a shape of the deformed part in the neutral state and the deformed state from the optical data.

13. A method as set forth in claim 1 wherein the step of applying the load is further defined as applying the load continuously from the neutral state to the deformed state.

14. A method as set forth in claim 1 wherein the step of applying the load is further defined as applying the load discretely from the neutral state to the deformed state and having at least one intermediate state therebetween.

15. A method as set forth in claim 14 wherein the step of transmitting the light is further defined as discretely transmitting the light while the deformable part is in the neutral state, in the deformed state, and in at least one intermediate state.

16. A method as set forth in claim 1 wherein the step of transmitting the light is further defined as continuously transmitting the light while the deformable part is deformed from the neutral state to the deformed state.

17. A system for calibrating measurement of deformation, said system comprising:

an optical fiber measurement system comprising a deformable part and an optical fiber supported by said deformable part, said optical fiber extending between a first end and a second end and comprising at least one core having a plurality of grating sensors inscribed integrally therein with said sensors spaced along a length between said first and said second ends for sensing strain thereon;

an emitter in communication with said optical fiber for emitting a light in a predetermined band of wavelengths through said at least one core that is reflected by said grating sensors;

an interrogator in communication with said optical fiber for detecting said reflected light from said grating sensor for generating optical data;

a testing fixture for supporting said deformable part;

a load frame machine for applying a load to said deformable part and deforming said deformable part and inducing strain in said optical fiber such that said grating sensors reflect said light as said deformable part deforms to generate load data; and at least one camera recording said deformable part as said load is applied thereto for capturing images of said deformable part; and a processing system receiving said optical data, said load data, image deformation data, said processing system generating a correlation factor based on said image deformation data and said optical data so that said optical fiber measurement system is calibrated to ensure accurate measurement of subsequent deformation of said deformable part.

18. A system as set forth in claim 17 further comprising a telescoping rod operatively connected to said deformable part for generating compression signals and further comprising a data acquisition system in communication with said telescoping rod for generating compression data corresponding with said compression signals.

19. A system as set forth in claim 17 further comprising a plurality of target points spaced about said deformable part that are detectable by said camera.

20. A system as set forth in claim 19 wherein said sensors are adjacent to said target points.

21. A system as set forth in claim 19 further comprising at least one reference point supported on said testing fixture that is detectable by said camera.

22. A system as set forth in claim 19 wherein said plurality of target points are spaced equidistant from one another about said part.

23. A system as set forth in claim 19 further comprising a carrier carrying said target points and aligning said plurality of target points relative to said deformable part.

24. A system as set forth in claim 19 further comprising a positioning tool positioning said target points relative to said deformable part.

25. A system as set forth in claim 17 wherein said deformable part further comprises at least one head assembly, leg assembly, arm assembly, rib cage assembly, or rib for an anthropomorphic test device.

26. A system as set forth in claim 17 wherein said optical fiber is embedded within said deformable part.

27. A system as set forth in claim 17 wherein said optical fiber is surface mounted to said deformable part.

28. A device as set forth in claim 17 wherein said deformable part is further defined as a rib having an inner rib layer and an outer rib layer.

* * * * *